United States Patent
Merritt et al.

(10) Patent No.: US 6,644,006 B1
(45) Date of Patent: Nov. 11, 2003

(54) REMOTE REVERSE CONTROL FOR PICK-UP ROTOR

(75) Inventors: John H. Merritt, New Holland, PA (US); Lee S. Curley, Gap, PA (US); Randall D. Kern, New Holland, PA (US); David M. Malloy, Ephrata, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/198,742

(22) Filed: Jul. 19, 2002

(51) Int. Cl.[7] .................. A01D 39/00; A01D 43/02; A01D 75/00
(52) U.S. Cl. .......................... 56/341; 56/11.2
(58) Field of Search .............. 56/341, 10.8, 11.2, 56/11.4, 11.5, 11.7; 460/103

(56) References Cited

U.S. PATENT DOCUMENTS

| | | | |
|---|---|---|---|
| 3,608,557 A | | 9/1971 | Evans |
| 4,218,864 A | | 8/1980 | Allemeersch et al. |
| 4,296,596 A | * | 10/1981 | Waldrop et al. ............ 56/341 |
| 4,400,930 A | | 8/1983 | Huhman et al. |
| 4,424,662 A | * | 1/1984 | Eggers et al. ............ 56/341 |
| 4,430,847 A | | 2/1984 | Tourdot et al. |
| 4,467,590 A | | 8/1984 | Musser et al. |
| 4,470,243 A | | 9/1984 | Rayfield |
| 4,512,139 A | | 4/1985 | Musser et al. |
| 4,663,919 A | | 5/1987 | Stroh et al. |
| RE32,599 E | | 2/1988 | Musser et al. |
| 4,879,868 A | | 11/1989 | Love |
| 4,962,632 A | * | 10/1990 | Schoonheere et al. ........ 56/341 |
| 5,054,387 A | * | 10/1991 | Diederich et al. ............ 100/5 |
| 5,462,486 A | | 10/1995 | Norton |
| 5,529,218 A | | 6/1996 | Favre et al. |
| 5,778,644 A | | 7/1998 | Keller et al. |
| 5,996,324 A | | 12/1999 | Oligmueller |
| 6,164,050 A | | 12/2000 | Vande Ryse et al. |
| 6,209,450 B1 | | 4/2001 | Naaktgeboren et al. |
| 6,247,296 B1 | | 6/2001 | Becker et al. |

* cited by examiner

*Primary Examiner*—Árpád Fábián Kovács
(74) *Attorney, Agent, or Firm*—John William Stader; Rebecca L. Henkel

(57) ABSTRACT

A baler having a baler frame, a main drive assembly that includes a starter roll drive shaft mounted to rotate on the baler frame, and a pick-up assembly connected to the baler frame is disclosed. The pick-up assembly has a reverse control apparatus for reversing the direction of rotation of a conveying rotor to disimpact any impacted plug of cut crop material from the rotor. The reverse control apparatus can be operated remotely from a tractor connected to the baler.

12 Claims, 10 Drawing Sheets

REMOTE REVERSE CONTROL FOR PICK-UP ROTOR

FIELD OF THE INVENTION

This invention pertains to round balers with a pick-up assembly that includes a conveying rotor for moving cut crop material from the ground to a bale forming chamber. More specifically, the present invention pertains to an improved pick-up drive assembly for the conveying rotor that allows the rotor to be rotated in reverse to the normal direction of rotation so as to unplug impacted cut crop material from the rotor. More particularly, because the pick-up drive assembly has a reverse control apparatus for selectively reversing the direction of rotation of the rotor.

BACKGROUND OF THE INVENTION

Typical round balers (also referred to simply as a "baler"), such as disclosed in U.S. Pat. No. 6,209,450 to Naaktgeboren et al., are agricultural machines that pick up a cut crop material from the ground and form it into a compacted round bale in a bale forming chamber. When the bale has been sufficiently compacted to a desired density or a desired size depending on the baler construction, bale density or bale size sensors, as is appropriate, send signals to a controller that subsequently sends a signal to an operator's panel to stop forward motion of the baler so that a bale wrapping operation can be performed, wherein the formed bale is wrapped with netting or twine to produce a completed wrapped bale.

As is conventionally known, the baler has a pick-up assembly located on the front of the baler that has a pick-up that serves to pick-up cut crop material, such as hay, straw, grass and the like, from windrows on the ground. The pick-up assembly then conveys the cut crop material with a conveyor, such as a rotating conveying rotor, into a bale forming chamber constructed within the baler. The pick-up assembly has a pick-up drive mechanism that operates to activate both the pick-up and the conveying rotor. The pick-up drive mechanism is operably connected to and driven by the main drive mechanism of the baler.

One drawback of the conventional pick-up drive mechanism is that it can only rotate the rotor in a single direction, being the "conveying direction" or "normal operating direction." The conveying direction of rotation is the direction of rotor rotation that moves cut crop material from the pick-up to the bale forming chamber. During operation of the pick-up assembly, impaction of the rotor with cut crop material has been known to occur. When the rotor becomes impacted, a wad or plug of cut crop material wedges itself between the rotor and the rotor housing. Once impacted, the rotor jams and fails to rotate properly. Consequently, the pick-up drive mechanism stops, which cause the baler's main drive mechanism to stop, and the baler stalls. To remedy the situation and clear the rotor of impacted cut crop material, the baler operator must perform a rotor disimpaction procedure that involves (a) stopping the tractor pulling the baler and dismounting, (b) using a tool to manually de-clutch the rotor from the baler's drive mechanisms, (c) physically rotating the rotor in the direction that is the reverse of the conveying direction to remove the impacted cut crop material, and (d) re-clutching the rotor before remounting the tractor and continuing normal operation of the baler.

For this reason, it is an object of the present invention to automate the rotor disimpaction procedure by providing the pick-up drive mechanism with a reverse control apparatus that includes a hydraulic cylinder mounted to the baler frame, wherein the hydraulic cylinder is connected to be operated from the tractor, and the hydraulic cylinder is connected to the pick-up drive mechanism so as to de-clutch the rotor drive, rotate the rotor in the reverse direction to the normal operating direction to effect rotor disimpaction, then re-clutch the rotor to resume rotation in the normal operating direction.

It is a further object of the present invention to provide an improved pick-up drive mechanism that is characterized by a pick-up drive assembly having a reverse control apparatus that permits automation of the rotor disimpaction procedure that maintains the advantages of the prior art baler devices while overcoming the disadvantages of the prior art machines.

A still further object of the present invention is to overcome the disadvantages of the prior art baler devices.

Another object of the present invention is to provide a baler with a controllable pick-up drive mechanism that is characterized by a pick-up drive assembly having a reverse control apparatus, which serves to selectively rotate the rotor in the reverse direction thereby automating the rotor disimpaction procedure.

Another object of the present invention is to provide a baler with a controllable pick-up drive mechanism that is characterized by a pick-up drive assembly having a reverse control apparatus that is controlled from a tractor pulling the baler.

Another object of the present invention is to provide a baler with a controllable pick-up drive mechanism that is characterized by a pick-up assembly having a reverse control apparatus that is practical and cost effective to manufacture.

Another object of the present invention is to provide a baler with a controllable pick-up drive mechanism that is characterized by a pick-up drive assembly having a reverse control apparatus that is both durable and reliable.

Another object of the present invention is to provide a baler with a controllable pick-up drive mechanism that is characterized by a pick-up drive assembly that is easy to maintain.

SUMMARY OF THE INVENTION

In accordance with the above objectives, a first embodiment of the present invention provides a baler having a baler frame, a main drive assembly that includes a starter roll drive shaft mounted to rotate in a first direction on the baler frame, and a pick-up assembly connected to the baler frame, the pick-up assembly having a reverse control apparatus for a conveying rotor and further characterized by: (a) a pick-up frame assembly connected to the baler frame; (b) a pick-up rotatably connected to the pick-up frame assembly; (c) a conveying rotor rotatably connected to the pick-up frame assembly; and (d) a pick-up drive assembly disposed on the pick-up frame assembly and connected to drive both the pick-up and the rotor, wherein the pick-up drive assembly comprises: (i) a rotatable first drive wheel disposed on the starter roll drive shaft; (ii) a clutch assembly operably connected to the first drive wheel, the clutch assembly having a first selective position to rotatingly engage the first drive wheel with the starter roll drive shaft and a second selective position to disengage the first drive wheel from the starter roll drive shaft; (iii) the reverse control apparatus comprising a hydraulic cylinder having a stroke with a first retracted position and a second extended position, the hydraulic cylinder connected at a first end to the pick-up frame assembly and connected at a second end to the clutch assembly, wherein when the hydraulic cylinder is in the second extended position the clutch assembly is in the second selective position, and when the hydraulic cylinder is in the first retracted position the clutch assembly is in the first selective position; and (iv) a second drive wheel rotatably connected to the pick-up frame assembly, the second drive wheel being connected to the first drive wheel by a flexible drive member so as to rotate in the first direction when the first drive wheel rotates in the first direction, and the second drive wheel is connected to rotate the rotor in a second direction, wherein the second drive wheel is connected to the second end of the hydraulic cylinder so as to rotate in a third direction that is the reverse of the first direction when the hydraulic cylinder is in the second extended position so that the second drive wheel rotates the rotor in a fourth direction that is the reverse of the second direction.

In accordance with a second embodiment of the present invention, the first embodiment is further modified so that the hydraulic cylinder moves from the first retracted position to the second extended position in response to a signal from a remote switch on a tractor connected to the baler.

In accordance with a third embodiment of the present invention, the first embodiment is further modified so that the reverse control apparatus further comprises a ratchet wheel attached to the second drive wheel so as to rotate therewith and the second end of the hydraulic cylinder is connected to a movable arm member that carries a ratchet wheel engaging dog member, wherein the ratchet wheel engaging dog member engages teeth of the ratchet wheel so as to effect rotation of the second drive wheel only in the third direction.

In accordance with a fourth embodiment of the present invention, the third embodiment is further modified so that the dog member has an edged portion and the teeth of the ratchet wheel are sloped so that the edge portion securely engages one of the teeth when hydraulic cylinder moves from the first retracted position to the second extended position.

In accordance with a fifth embodiment of the present invention, the fourth embodiment is further modified so that the reverse control apparatus further comprises a cam plate connected by a bar to the dog member, the pivot shaft being pivotally mounted on the arm member by a pivot shaft so that the cam plate and the dog member pivot on the pivot shaft as a single unit.

In accordance with a sixth embodiment of the present invention, the fifth embodiment is further modified so that the reverse control apparatus further comprises a biasing spring connected at one end to the arm member and at another end to the cam plate so as to bias the cam plate to rotate the dog member to engage the teeth of the ratchet wheel.

In accordance with a seventh embodiment of the present invention, the sixth embodiment is further modified so that the reverse control apparatus further comprises a roller disposed on a support arm so that when the hydraulic cylinder moves into the first retracted position the roller engages the cam plate and the cam plate rotates on the pivot shaft so as to move the dog member out of engagement with the teeth of the ratchet wheel.

In accordance with an eighth preferred embodiment of the present invention, the third embodiment is further modified so that the clutch assembly includes a second link member connected at one end to a second cam member of the clutch assembly and at another end to the arm member.

In accordance with a ninth embodiment of the present invention, the eighth embodiment is further modified so that the clutch assembly includes a first link member connected at one end to the baler frame and at another end to a first cam member of the clutch assembly.

In accordance with a tenth embodiment of the present invention, the ninth embodiment is further modified so that the first cam member provides a bearing for a rotatable first jaw member that is disposed on the starter roll drive shaft, wherein the first jaw member is attached to rotate with the first drive wheel, and the second cam member provides a bearing for a rotatable second jaw member, wherein the second jaw member is disposed on the starter roll drive shaft and has teeth to matingly engage teeth of the first jaw member.

In accordance with an eleventh embodiment of the present invention, the tenth embodiment is further modified so that the second link member moves the second cam member when the hydraulic cylinder moves between the first retracted position and the second extended position respectively, simultaneously the second cam member moves the second jaw member between a first engaging position and a second non-engaging position, wherein the second jaw member matingly engages and rotates the first jaw member when in the first engaging position and the second jaw member is disengaged from the first jaw member when in the second non-engaging position.

In accordance with a twelfth preferred embodiment of the present invention, the first embodiment is further modified so that the second drive wheel is disposed on a rotatable gear support shaft mounted on the pick-up frame assembly, wherein the second drive wheel rotates the gear support shaft, and a third gear is also disposed to rotate with the gear support shaft, and the rotor is disposed to rotate on a rotatable rotor drive shaft mounted to the pick-up frame assembly, and a fourth gear is disposed to rotate on the rotor drive shaft, wherein the third gear engages the fourth gear so as to rotate the fourth gear, the rotor drive shaft and the rotor when the second drive wheel rotates the third gear.

Further objects, features and advantages of the present invention will become apparent from the Detailed Description of the Preferred Embodiments, which follows, when considered together with the attached drawings.

DETAILED DESCRIPTION OF THE PREFERRED EMBODIMENTS

Figure 1:
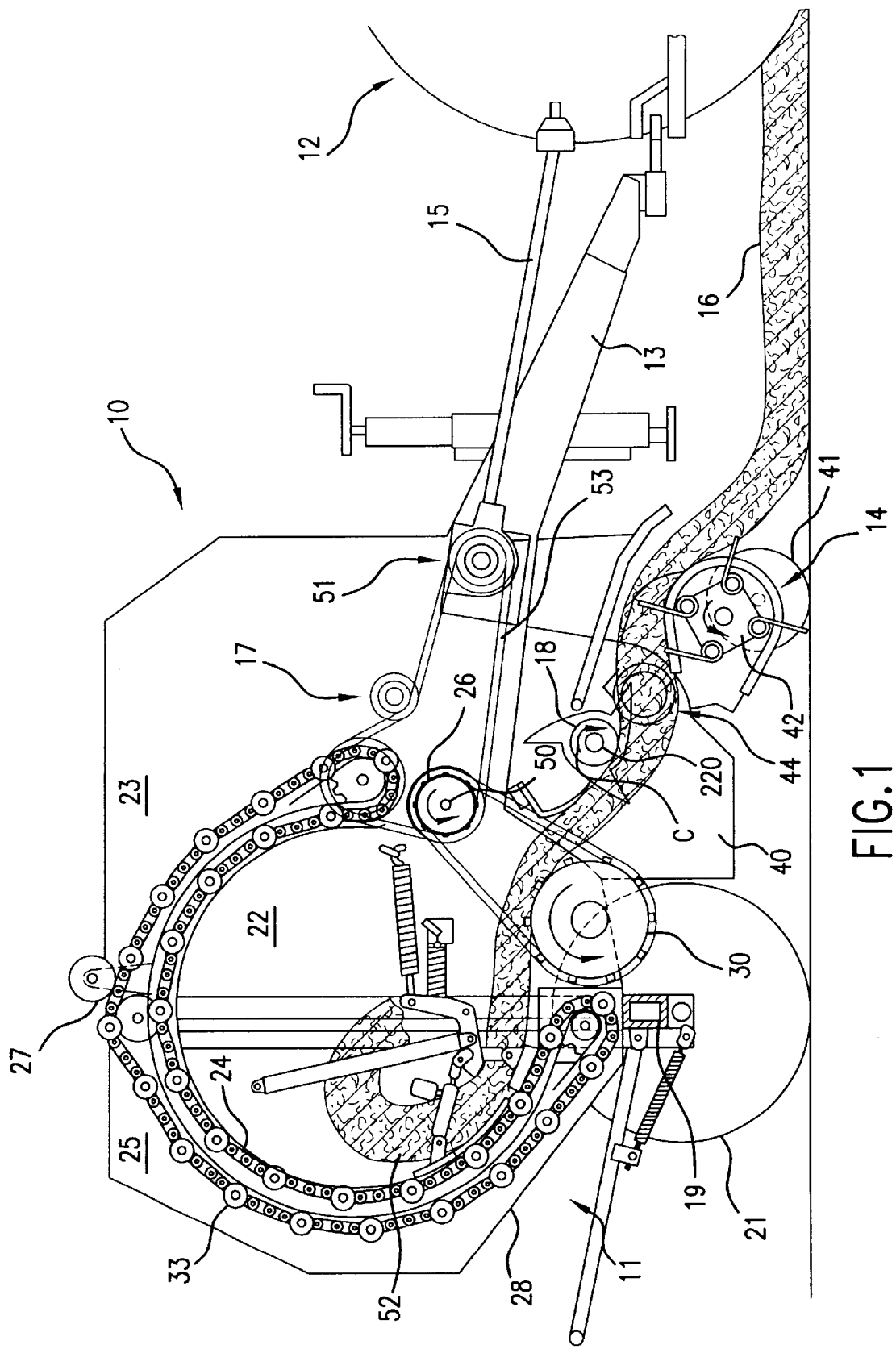
FIG. 1 is a schematic side view of a round baler incorporating the reverse control mechanism for a pick-up assembly's rotor in accordance with the present invention.

The preferred embodiments of the invention will now be described with reference to the Figures in which like parts are indicated by like reference numerals. The apparatus of the present invention is a round baler 10 as shown in FIG. 1 that has a frame 11 that also provides a housing for the baler. Frame 11 includes a tongue or hitch 13 that is connectable to a tractor 12 or other work vehicle that pulls the baler 10. Tractor 12 is operably connectable to baler 10 to provide power to drive the main drive assembly 17 of the baler 10 via a tractor power transmission assembly 15 as is conventionally known. Frame 11 supports and houses the baler main drive assembly 17.

Baler 10 typically includes a bale forming chamber 22 formed inside of frame 11. In FIG. 1, the bale forming chamber 22 is illustrated as a fixed bale forming chamber for forming a geometrical package out of cut crop material 16. The geometrical package of cut crop material formed in the bale forming chamber 22 is known as a "bale." The bale 52 is formed by a chain conveyer 24, also referred to as an "apron," that surrounds and defines a portion of the chamber 22. Apron 24 is powered by the baler's main drive assembly 17 and serves to rotate the cut crop material in the bale forming chamber 22 by using slats 33 of the apron 24 that engage and rotate the cut crop material thereby moving the cut crop material about the bale forming chamber 22 to form the bale 52 as described in U.S. Pat. No. 6,164,050 or U.S. Pat. No. 6,209,450, both of which are incorporated herein by reference in their entirety. Preferably, the bale produced in the bale forming chamber 22 has a cylindrical shape; however, one skilled in the art would appreciate that the present invention can be practiced on balers that produce rectangular bales and can be practiced by round balers having a variable bale forming chamber.

Main frame 11 includes a main support beam 19 on which a pair of wheels 21 (only one shown) is rotatably affixed. Frame 11 also includes a front pair of sidewalls 23 (only one shown) coextensive with a rear pair of sidewalls 25 (only one shown) between which the bale forming chamber 22 extends. As is conventionally known, the bale forming chamber 22 is defined by sidewalls 23 and 25, apron 24, rotating floor roll 30 and rotating starter roll 26. Starter roll 26 is fixedly disposed on and attached to starter roll drive shaft 50 that is rotatably mounted to frame 11.

A pair of stub shafts 27 (only one shown) pivotally connect tailgate 28 to main frame 11. Tailgate 28 pivotally rotates about the stub shafts 27 from the closed position shown in FIG. 1 to an open position as is conventionally known so that a completed wrapped bale can be discharged to the ground for subsequent handling. Tailgate 28 includes a pair of tailgate sidewalls 25 (only one shown) that are coextensive with sidewalls 23.

Baler 10 includes a pick-up assembly 14 for picking up a cut crop material 16, such as straw, hay, and the like, from a field and delivering it to a rotatable conveying rotor 18, which feeds the cut crop material into the bale forming chamber 22 while the baler moves across a field. The pick-up assembly 14 includes a pick-up frame assembly 40 upon which are mounted a pick-up 42, a pair of augers 44 (only one shown), rotor 18 and a pick-up drive assembly 46. Two wheels 41 (only one shown) are rotatably mounted to pick-up frame assembly 40. Pick-up frame assembly 40 is connected to main frame 11 and pick-up drive assembly 46 is operatively connected to receive power from the main drive assembly 17. As is conventionally known, a bale 52 is formed within the bale forming chamber 22 when cut crop material is fed into the chamber by the pick-up assembly 14 that is powered by the pick-up drive assembly 46, which is powered by the main drive assembly 17, which receives power from tractor 12 via tractor power transmission assembly 15. When the bale 52 reaches a predetermined size such as occurs in fixed size chambers, or in the alternative when the bale 52 reaches a predetermined density such as occurs in variable size chambers, appropriate size or density sensors respectively indicate that the bale is ready to be wrapped. Subsequently, the baler 10 stops its forward motion while a bale wrapping operation is performed by a bale wrapping assembly (not shown), and a completed wrapped bale is ejected from the baler through the tailgate 28, which opens to permit discharge of the bale to the ground.

The present invention is directed primarily to a remote reverse control mechanism for the rotor 18 of the pick-up assembly 14 so that the rotor 18 can be selectively rotated in the conveying direction (i.e., the normal operating direction when conveying cut crop material) as shown by arrow C in FIG. 1, or selectively rotated in a reverse direction (i.e., in a direction opposite to arrow C) when the rotor becomes impacted with a plug of cut crop material. Preferably, the control mechanism is remotely controlled from the tractor 12 as will be described below.

Specifically, as shown in FIGS. 1–5, pick-up drive assembly 46 is operably connected to the rotatable starter roll drive shaft 50 that rotates in a first direction (i.e., counterclockwise), being its operating direction. Drive shaft 50 is connected to and driven to rotate in the first direction by the main drive assembly 17. Main drive assembly 17 includes a transmission gear unit 51 that receives and transmits mechanical power from the tractor power transmission assembly 15, connected to tractor 12, to starter roll 26 using a flexible drive member 53 such as a drive chain or drive belt.

Figure 6:
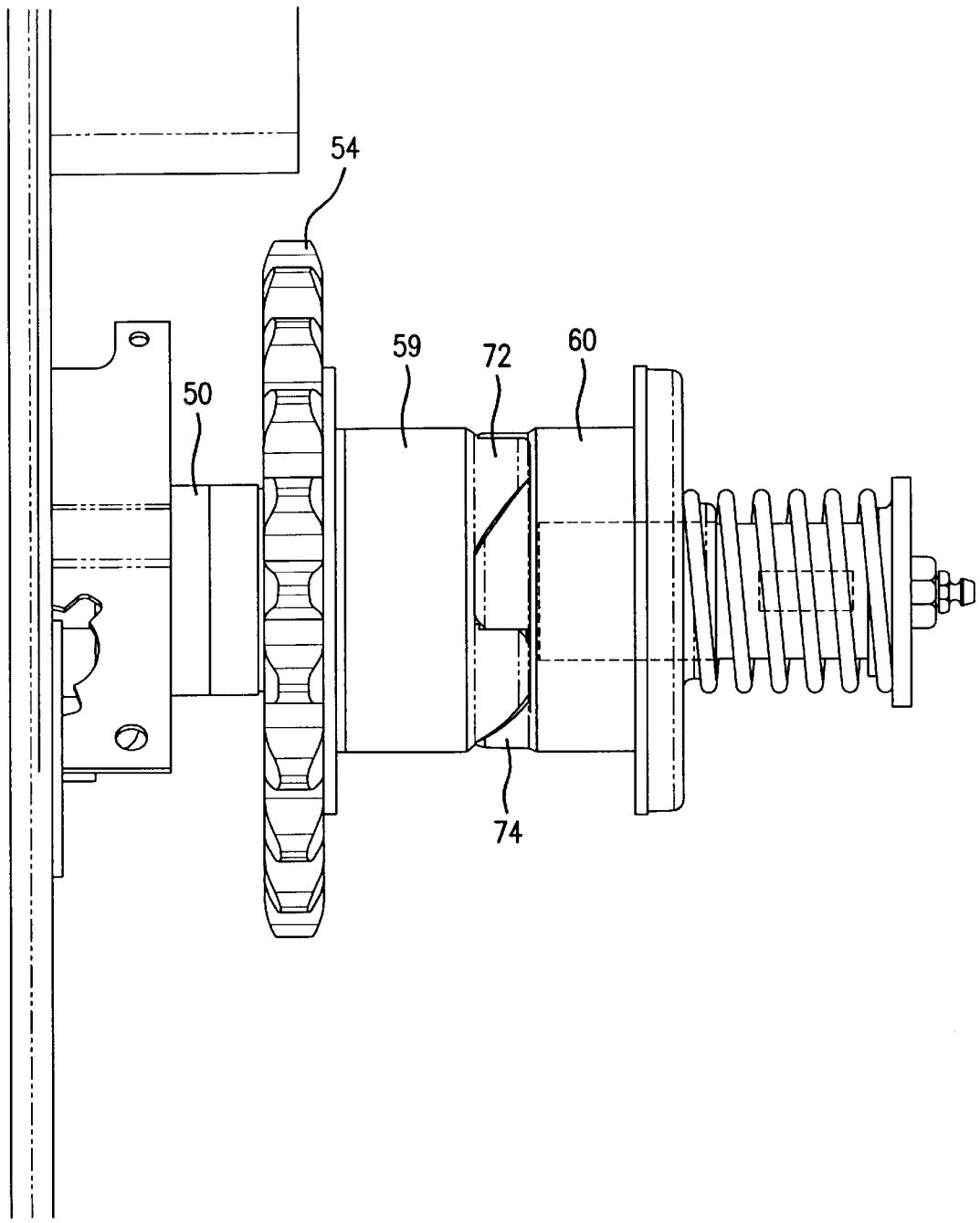
FIG. 6 is a schematic view of the relationship between the drive wheel and jaw members disposed on starter roll drive shaft with the second jaw member in the first rotating position.

Pick-up drive assembly 46 includes a toothed drive wheel 54 disposed axially on drive shaft 50 so as to be rotatable by the shaft 50; however, starter roll drive shaft 50 is also provided with a jaw clutch cam assembly 56 disposed thereon that includes first cam member 58 that provides a bearing to which first jaw member 59 is affixed to rotate in the bearing. First jaw member 59 is disposed on drive shaft 50 so as to be rotatable thereon, and is fixedly connected to drive wheel 54 so that first jaw member 59 and drive wheel 54 are rotatable as a single unit. First jaw member 59 has jaw teeth 72 that are shaped to matingly engage the jaw teeth 74 of second jaw member 61 as shown in FIG. 6. Second jaw member 61 is disposed on drive shaft 50 so as to be rotatable thereon and is disposed in second cam member 60, which provides a bearing to which second jaw member 61 is affixed so as to rotate in the bearing. Second jaw member 61 is splined to the starter roll drive shaft 50 so as to rotate with the drive shaft 50 when the second jaw member is in the "first rotating position" illustrated in FIG. 6. The first rotating position corresponds to the condition wherein the first jaw member 59 and the second jaw member 61 are matingly engaged, so one skilled in the art would realize that the first jaw member 59, the second jaw member 61, and the drive wheel 54 all rotate together as a unit with the starter roll drive shaft 50 when the second jaw member 61 is in the first rotating position.

Figure 2:
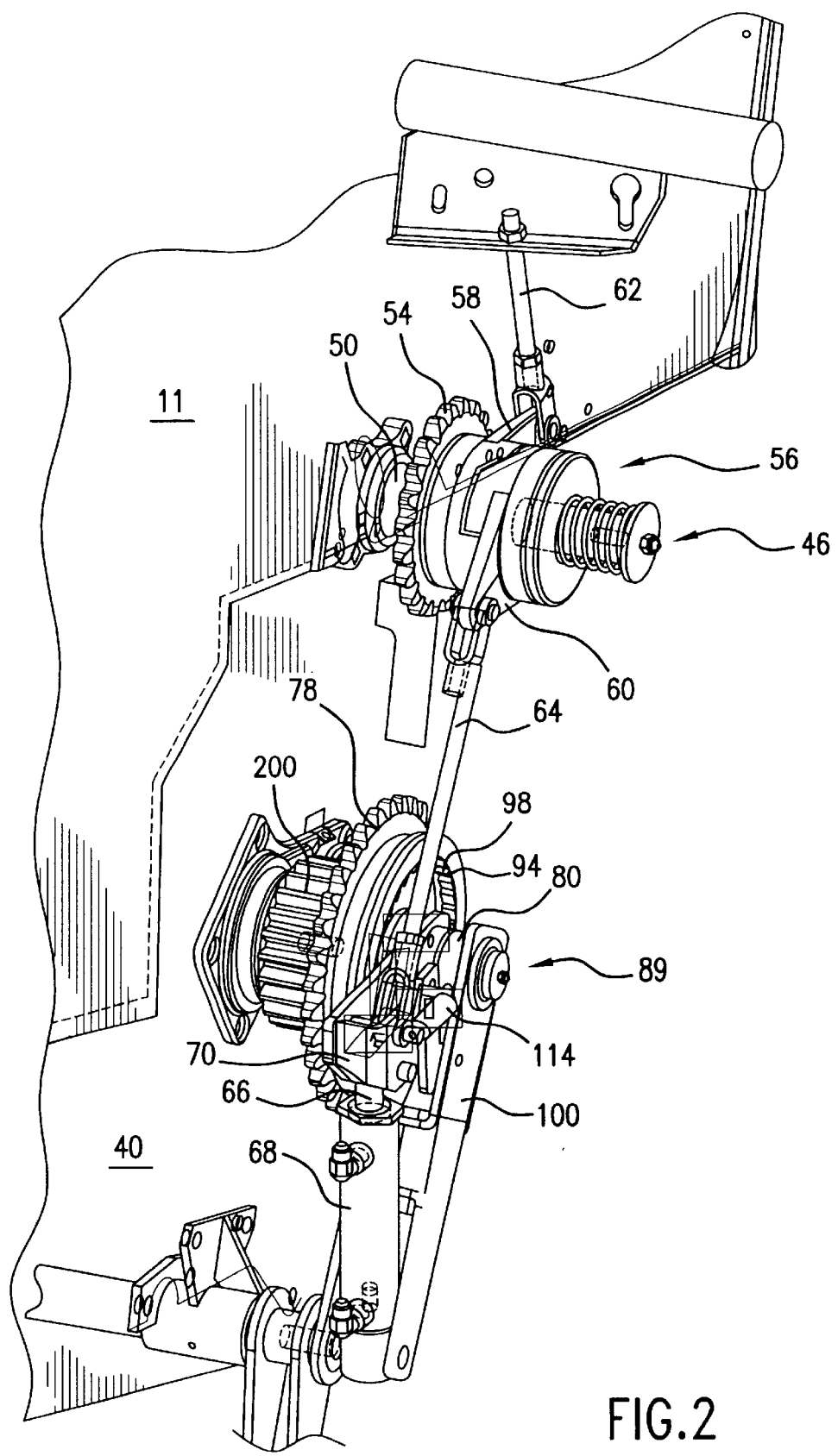
FIG. 2 is a perspective view of a portion of the baler's pick-up drive assembly having a reverse control apparatus for reversing the rotation of the pick-up assembly's rotor, wherein the hydraulic cylinder of the reverse control apparatus is shown in the retracted position.
Figure 3:
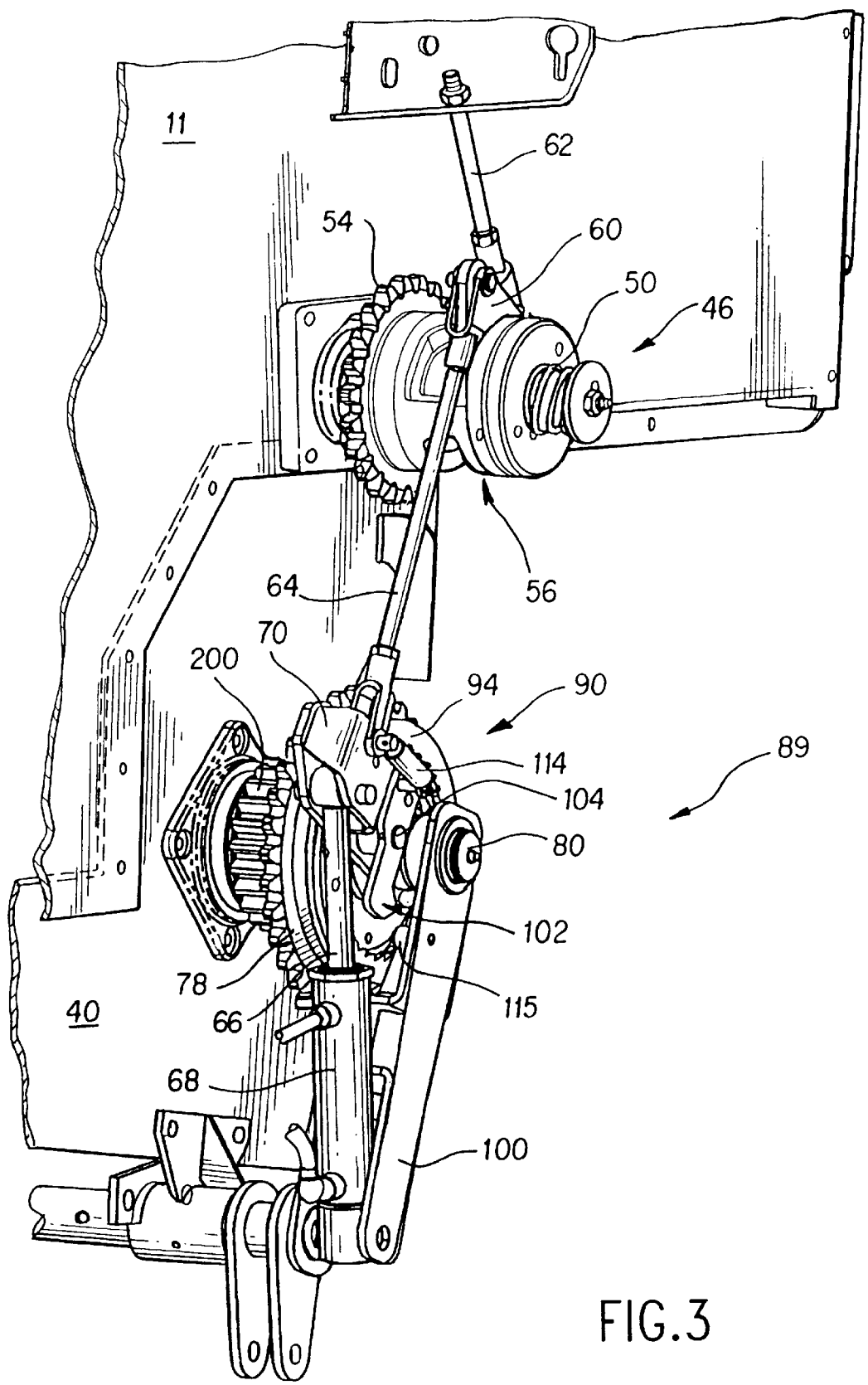
FIG. 3 is a perspective view of a portion of the baler's pick-up drive assembly having a reverse control apparatus for reversing the rotation of the pick-up assembly's rotor, wherein the hydraulic cylinder of the reverse control apparatus is shown in the extended position.

The second jaw member 61 selectively engages the first jaw member 59 as will be described. Specifically, first jaw member 59 is held in place on drive shaft 50 in the bearing of first cam member 58. First cam member 58 is attached to frame 11 by first link member 62 so that first cam member 58 and its bearing are held in place on shaft 50. Second cam member 60 is also disposed on shaft 50 adjacent to the first cam member 58, but the second cam member 60 is able to rotate about drive shaft 50, which serves as a pivot axis for the second cam member. Second cam member 60 is attached to second link member 64, which is attached to the piston 66 of a hydraulic cylinder 68 by arm member 70. Second cam member 60 rotates about drive shaft 50 when piston 66 moves. As shown in FIGS. 2 and 3, second cam member 60 and its bearing are capable of rotating about drive shaft 50 and of moving axially along drive shaft 50.

Figure 4:
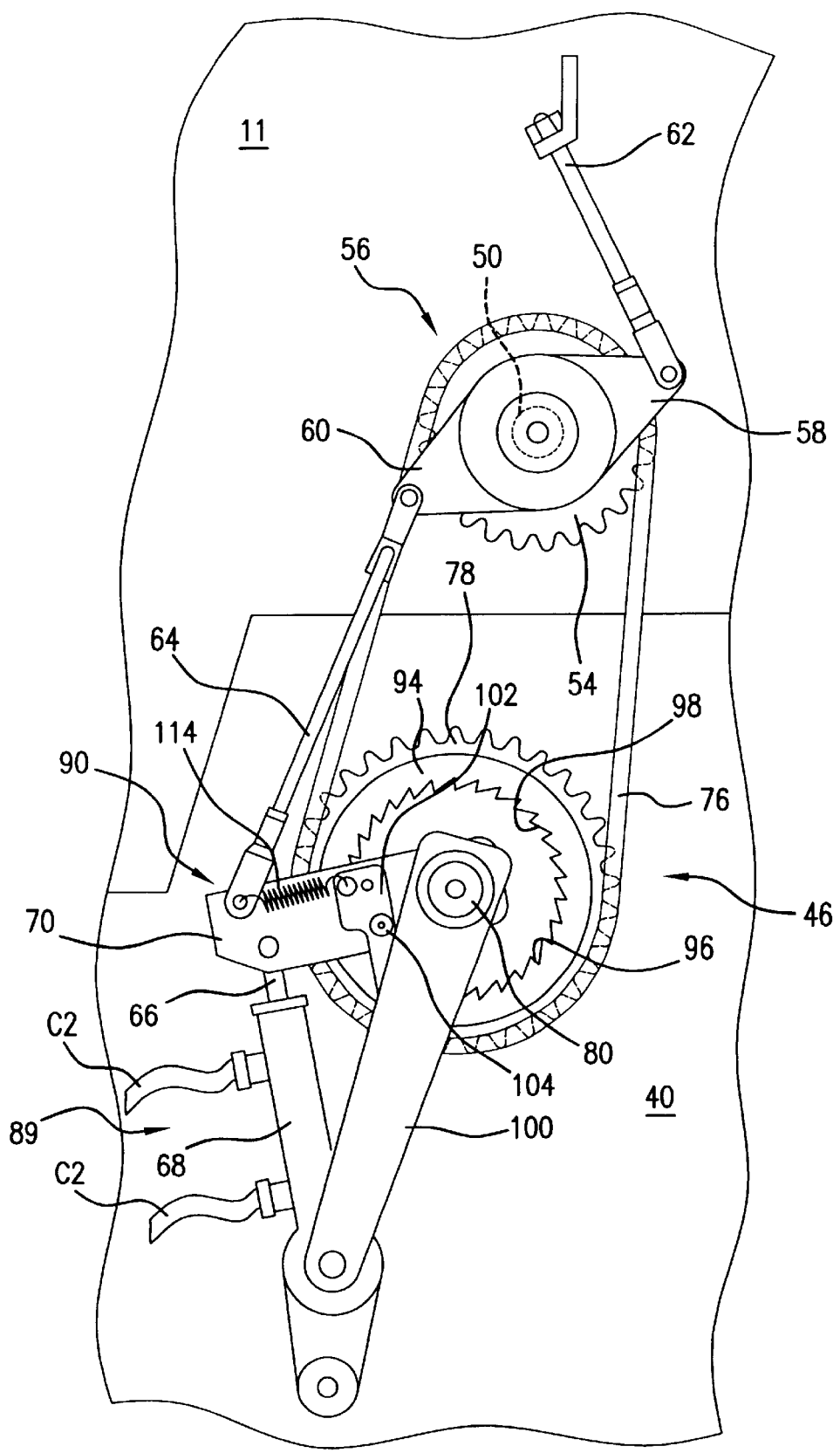
FIG. 4 is a side view of a portion of the pick-up drive assembly of the baler having a reverse control apparatus for reversing the rotation of the pick-up assembly's rotor, wherein the hydraulic cylinder of the reverse control apparatus is shown in the retracted position.
Figure 5:
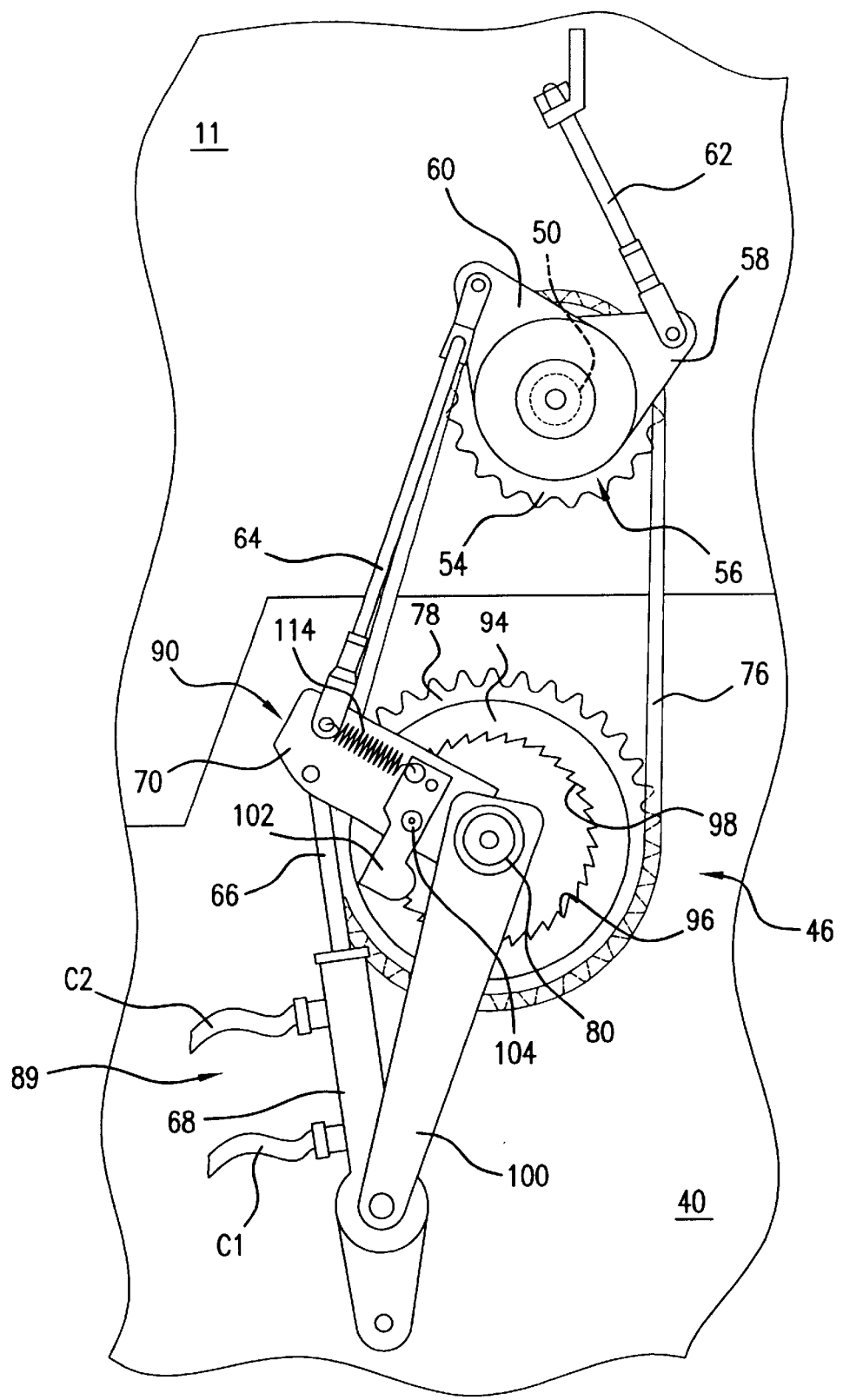
FIG. 5 is a side view of a portion of the pick-up drive assembly of the baler having a reverse control mechanism for reversing the rotation of the pick-up assembly's rotor, wherein the hydraulic cylinder of the reverse control apparatus is shown in the extended position.

As shown in FIGS. 2–5, the second cam member 60 is rotatable relative to the first cam member 58, wherein the rotation of the second cam member 60 is effected by the change in position of piston 66 between a retracted position shown in FIGS. 2 and 4 and an extended position shown in FIGS. 3 and 5. As shown in FIGS. 2–5, movement of piston 66 between the retracted position and the extended position moves arm member 70, which moves the second link member 64 and the second cam member 60. Movement of the piston 66 between the retracted and extended positions results in simultaneous rotational and axial movement of second cam member 60 and at least axial movement of second jaw member 61 relative to drive shaft 50.

Figure 7:
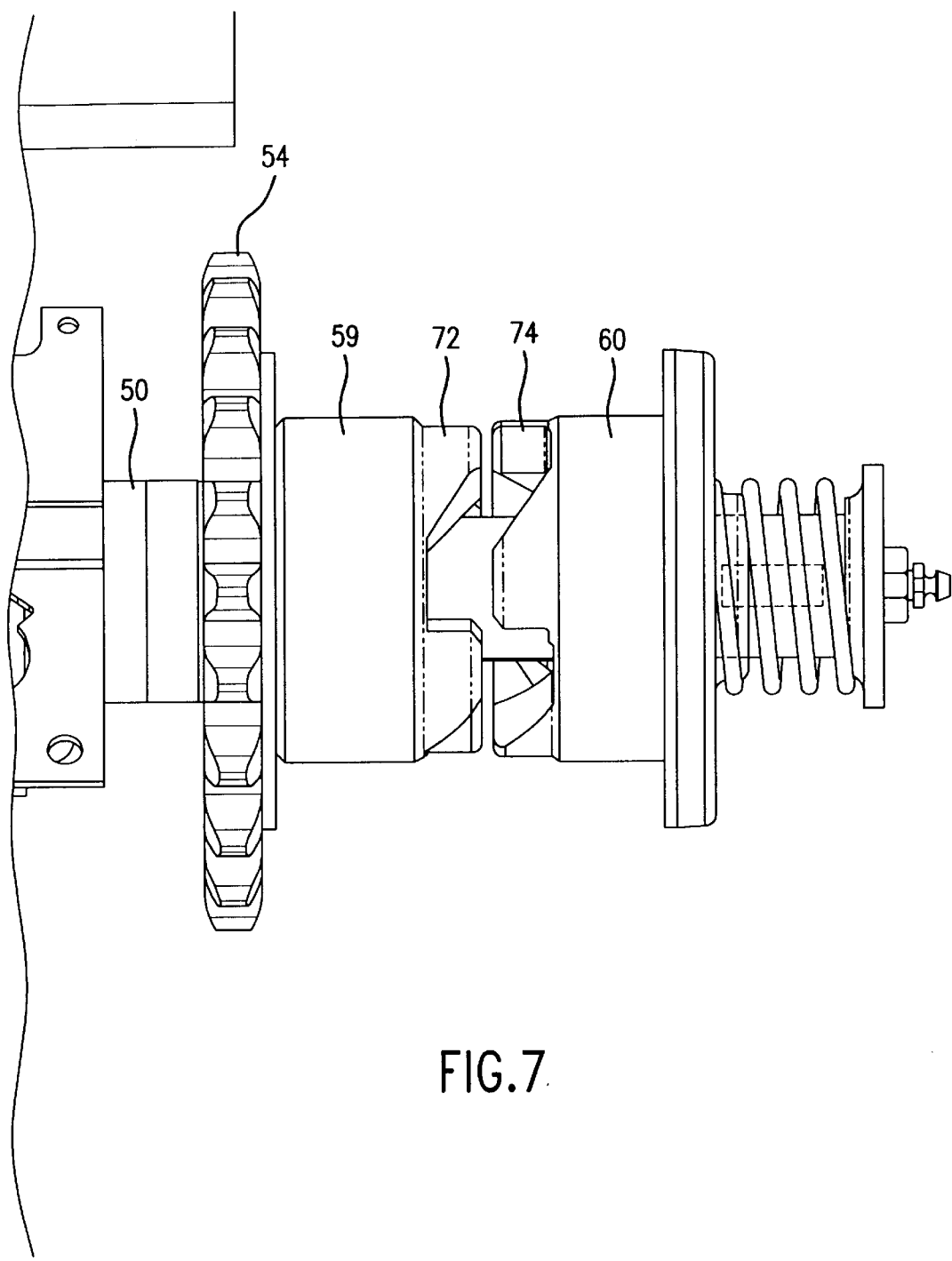
FIG. 7 is a schematic view of the relationship between the drive wheel and jaw members disposed on starter roll drive shaft with the second jaw member in the second non-rotating position.

When the piston 66 is in the retracted position, the jaw teeth 72 and 74 of first and second jaw members 59 and 61, respectively, are matingly engaged as shown in FIG. 6. When jaw members 59 and 61 are matingly engaged, drive wheel 54 rotates on drive shaft 50 with jaw members 59 and 61 because jaw member 61 is held by splines (not shown) on drive shaft 50 so as to be rotatingly driven by drive shaft 50. When piston 66 is in the extended position shown in FIGS. 3 and 5, the second cam member 60 has rotated and the second jaw member 61 has moved axially along drive shaft 50 as shown in FIG. 7. FIG. 7 illustrates the "second non-rotating position" of second jaw member 61, which is no longer positioned on drive shaft 50 so as to engage splines on the drive shaft 50. In other words, second jaw member 61 is no longer rotating with drive shaft 50 because jaw member 61 has moved out of contact with the splined portion of drive shaft 50. As second cam member 60 is rotated, the jaw teeth 72 and 74 disengage (i.e., move axially apart) so that a space forms between jaw members 59 and 61 as the second jaw member 61 is pushed away from drive wheel 54 and first jaw member 59. In this manner, when piston 66 extended, the second cam member 60, its bearing, and second jaw member 61 fixed in the bearing are pushed away from drive wheel 54, thereby disengaging the jaw clutch cam assembly 56 so that drive wheel 54 no longer rotates with drive shaft 50.

As shown in FIGS. 4 and 5, drive wheel 54 is connected by a flexible drive chain 76 to rotate a toothed drive wheel 78. Drive wheel 78 is disposed on, and fixed to rotate, gear support shaft 80. Gear support shaft 80 is rotatably mounted to pick-up frame assembly 40. An intermediate transmission gear 200 is also disposed on, and fixedly attached to rotate with, gear support shaft 80. When drive wheel 54 is selectively engaged to, and driven by, drive shaft 50 in the counterclockwise direction as described above, drive wheel 78, gear support shaft 80, and transmission gear 200 are also driven to rotate in the counterclockwise direction.

Figure 8:
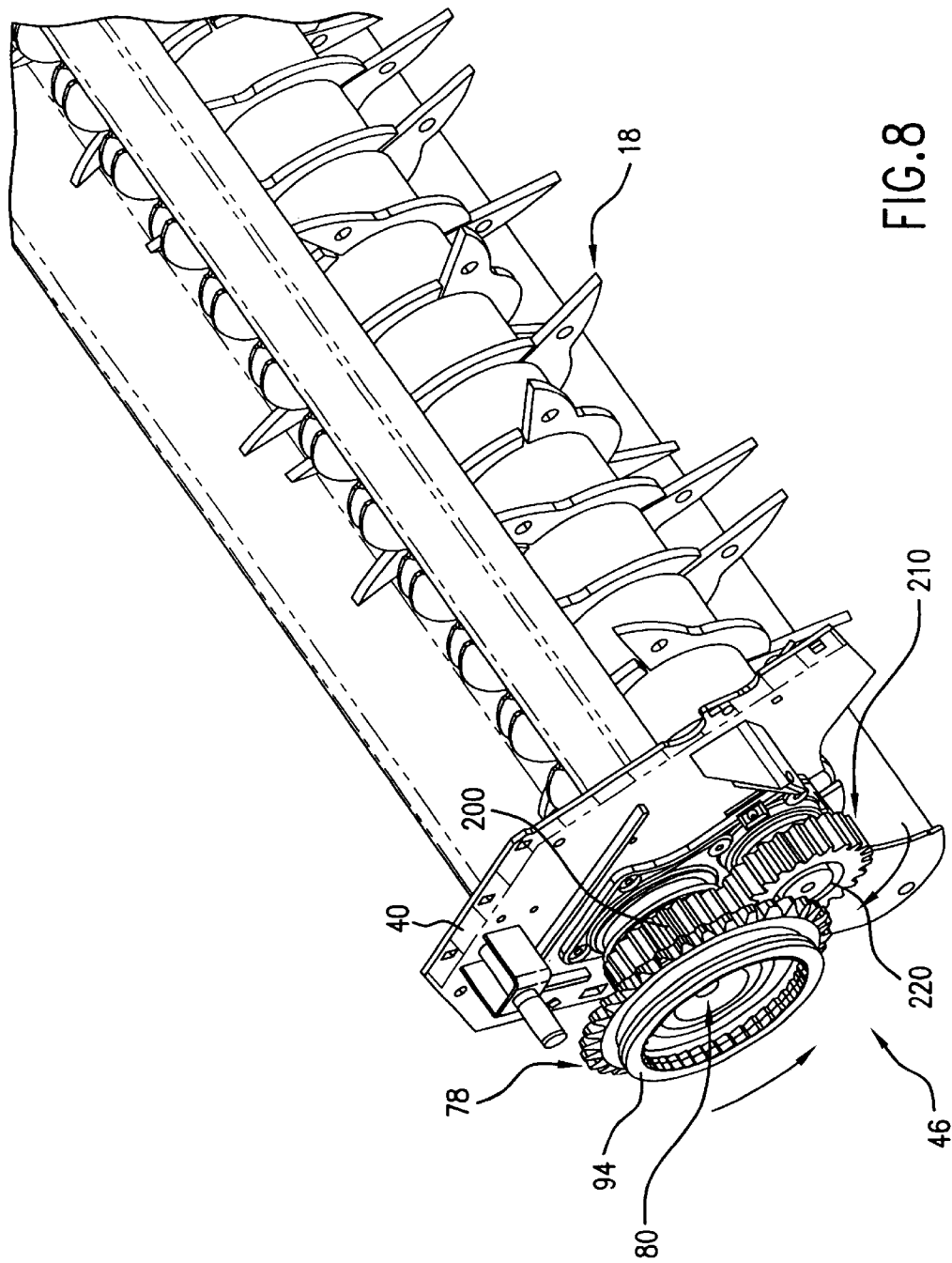
FIG. 8 is a schematic view of that portion of the pick-up drive assembly that includes the rotor.

As shown in FIG. 8, the pick-up drive assembly 46 includes rotor gear 210 that rotatingly engages transmission gear 200 so as to be rotated in the clockwise direction, being the normal operating direction for the rotor 18 to convey cut crop material towards the bale forming chamber 22, when transmission gear 200 rotates in the counterclockwise direction. Rotor gear 210 is disposed on, and fixed to rotate with, rotor drive shaft 220. Rotor drive shaft 220 is rotatably mounted to pick-up frame assembly 40 and rotor 18 is disposed axially on rotor drive shaft 220 so as to rotate therewith. Consequently, rotor drive shaft 220 and rotor 18 rotate in the clockwise direction (i.e., the normal operating direction for the rotor 18) when the rotor gear 210 is rotated in the clockwise direction.

However, when piston 66 moves into the extended position, drive wheel 54 is disengaged from being rotatingly driven by drive shaft 50 as described above. Under this circumstance, drive wheel 78, gear support shaft 80, and transmission gear 200 are no longer driven to rotate in the counterclockwise direction. In fact, as piston 66 is extended, the drive wheel 78, gear support shaft 80, transmission gear 200 and drive wheel 54 are forced to rotate in the clockwise direction by a mechanism for reversing the direction of rotation of the rotor 18. Pick-up drive assembly 46 includes a mechanism (also referred to as the "reverse control apparatus") for reversing the direction of rotation of the rotor 18, which reverses the direction of rotor rotation while the jaw clutch cam assembly 56 simultaneously disengages drive wheel 54 from drive shaft 50 so that the rotor 18 is not being driven by the drive shaft 50 while the rotor reversing mechanism 90 rotates the rotor 18 in the reverse direction. In this context, the "reverse direction" is defined as the direction of rotation of rotor 18 that is the reverse direction (i.e., counterclockwise rotation) of the normal operating direction (i.e., clockwise rotation) for the rotor 18. The reverse control apparatus 89 includes the hydraulic cylinder 68 and the rotor reversing mechanism 90.

The rotor reversing mechanism 90 includes arm member 70, dog assembly 92, and ratchet wheel 94 having teeth 98 on the inner surface 96 thereof. Arm member 70 is pivotally connected at one end to piston 66 and second link member 64, and at the other end is pivotally connected to gear support shaft 80 to rotate relative to support bar 100. Support bar 100 provides a bearing for gear support shaft 80.

Figure 9:
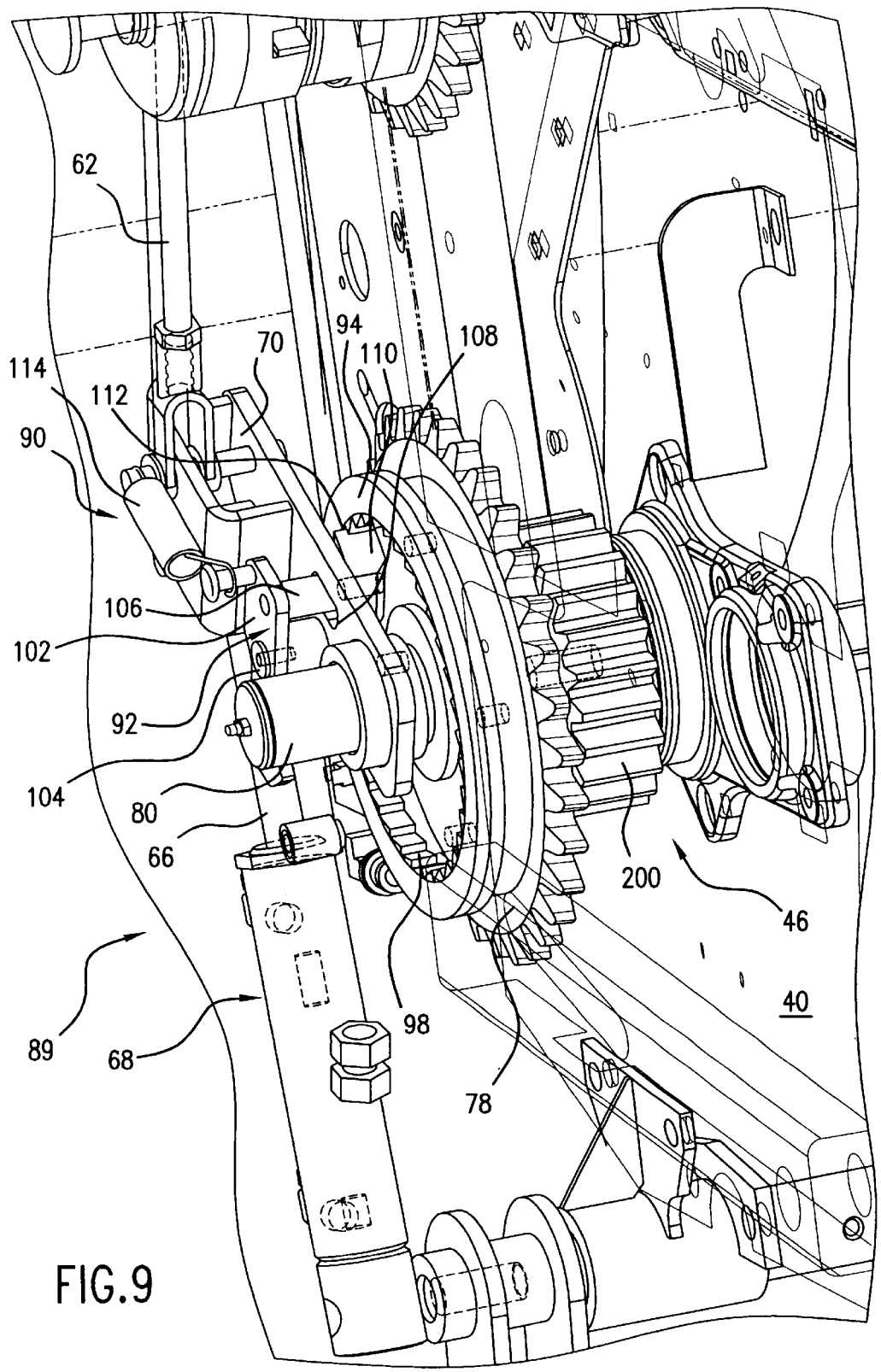
FIG. 9 is a schematic perspective view of the dog member engaging a tooth of the ratchet wheel of the reverse control apparatus.

As shown in FIGS. 2, 3 and 9, ratchet wheel 94 is fixedly attached to, and axially aligned with, one side of drive wheel 78 so that both wheels 94 and 78 rotate with gear support shaft 80. Dog assembly 92 is connected to arm member 70 and includes cam plate 102 pivotally connected to arm member 70 by pivot shaft 104. Cam plate 102 is also fixedly connected to bar 106 that extends through a hole 108 formed in arm member 70 so that bar 106 is also fixedly connected to dog member 110 as shown in FIG. 6. Dog member 110 is shaped so that an edge portion 112 of the dog member 110 can securely engage the teeth 98 of ratchet wheel 94 (best seen in FIG. 9) so that when piston 66 is extending into the extended position, the edge portion 112 securely engages one of the teeth 98 thereby causing the ratchet wheel 94 to be rotated clockwise in a reversed direction as arm member 70 pivots clockwise about gear support shaft 80. As ratchet wheel 94 is rotated in the reversed direction by the extending piston 66, the attached drive wheel 78, gear support shaft 80, and transmission gear 200, as well as drive wheel 54 connected via drive chain 76 to drive wheel 78, are forced to rotate in the clockwise direction. As a result, rotor gear 210, rotor drive shaft 220, and rotor 18 are forced to rotate in the counterclockwise direction. In this manner, rotor 18 is rotated in the reverse direction, which allows any impacted cut crop material to spontaneously drop away from the rotor 18 thereby effectively disimpacting the rotor.

To ensure that the edge portion 112 will properly engage the teeth 98 of ratchet wheel 94, the rotor reversing mechanism 90 is provided with a biasing spring 114 disposed on arm member 70 so that one end of the biasing spring 114 is connected to the arm member 70 and the other end of the biasing spring is connected to one end of cam plate 102. In this manner, biasing spring 114 provides a biasing force tending to rotate cam plate 102 and dog member 110 counterclockwise about pivot shaft 104 so that edge portion 112 abuts against the teeth 98. However, so that dog member 110 does not interfere with the rotation of ratchet wheel 94 and drive wheel 78 when wheels 94 and 78 are rotated in the counterclockwise direction, teeth 98 are sloped so that the edge portion 112 can securely engage one of the teeth 98 so as to rotate the ratchet wheel 94 only when the arm member 70 is being rotated in a clockwise direction about gear support shaft 80. Under any other conditions, particularly when drive wheel 78 and ratchet wheel 94 are rotating in the counterclockwise direction, the edge portion 112 of dog member 110 may merely abut, but does not securely engage, teeth 98 so that the dog member has no significant effect on the counterclockwise rotation of ratchet wheel 94. Furthermore, a roller 115 is disposed on an undersurface of support bar 100. Roller 115 serves as a stop or guide and engages cam plate 102 when piston 66 returns to the retracted position while arm member 70 is rotated counterclockwise about gear support shaft 80. Cam plate 102 is shaped, and pivot shaft 104 is disposed on cam plate 102, so that when cam plate 102 engages roller 115, cam plate 102 is rotated clockwise about pivot shaft 104, thereby rotating dog member 110 out of engagement with teeth 98 of ratchet wheel 94.

Figure 10:
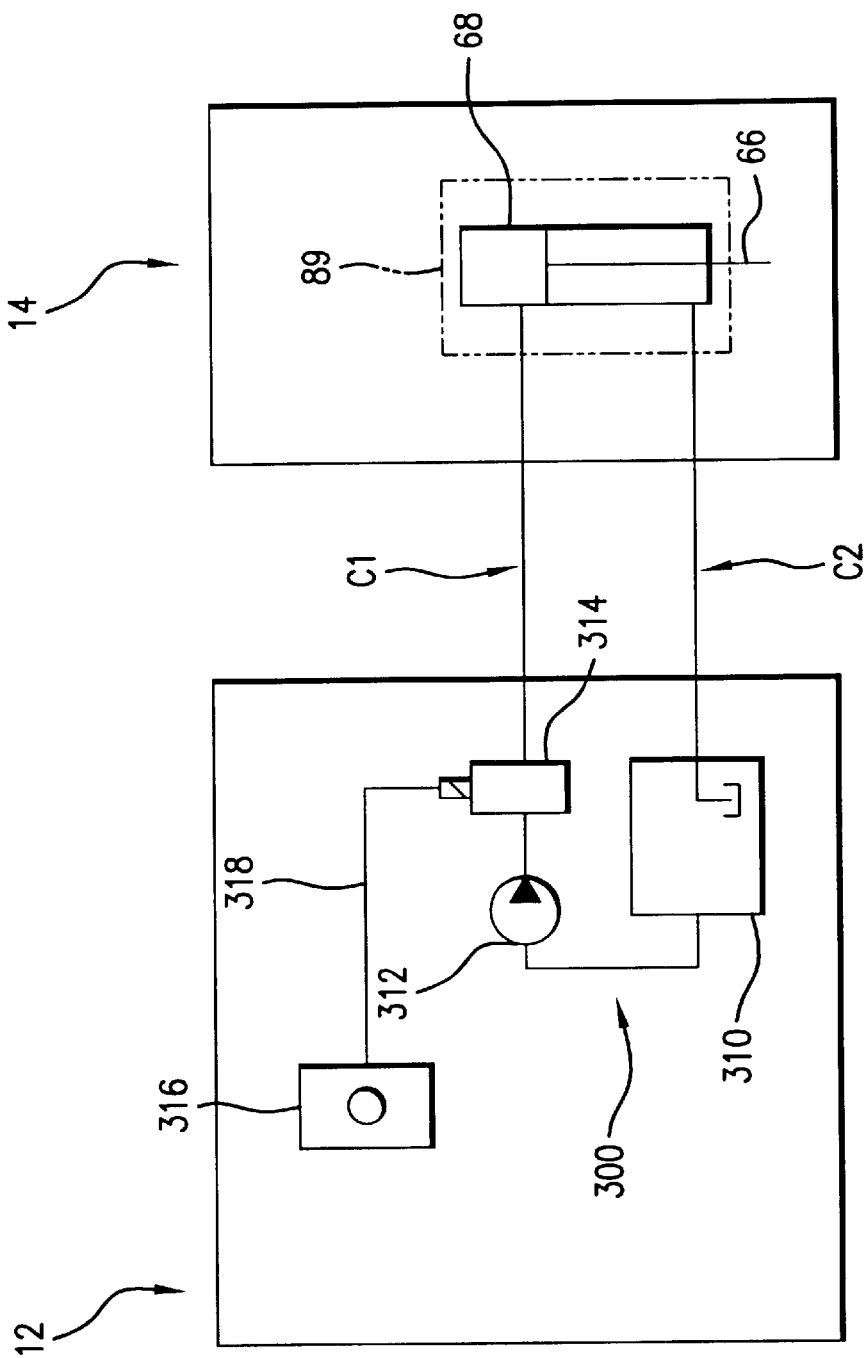
FIG. 10 is a schematic representation of the remote control for the hydraulic cylinder of the reverse control apparatus of the pick-up assembly.

Preferably, rotor reverse control apparatus 89 is controlled remotely from the tractor 12 as illustrated by the hydraulic circuit 300 of FIG. 10. Hydraulic circuit 300 is the hydraulic circuit of tractor 12 and includes a hydraulic fluid reservoir 310 connected to provide hydraulic fluid to hydraulic pump 312 that is connectable to provide hydraulic fluid via conduit C1 to hydraulic cylinder 68 of pick-up assembly 14 so as to provide hydraulic power to activate piston 66. Hydraulic fluid can drain back from cylinder 68 to reservoir 310 via conduit C2. Activation of hydraulic cylinder 68 is controlled by a solenoid activated hydraulic valve 314. An electrical switch 316 disposed on tractor 12 is operable to send an electrical signal to solenoid activated hydraulic valve 314 via wire 318. Thus, activation of switch 316 activates the hydraulic valve 314 and hydraulic circuit 300 remotely activates hydraulic cylinder 68 from tractor 12. Activation of cylinder 68 results in movement of piston 66 that effects operation of the rotor reverse control apparatus 89 as described above.

While the present invention has been described with reference to certain preferred embodiments, one of ordinary skill in the art will recognize that additions, deletions, substitutions, modifications, and improvements can be made while remaining within the spirit and scope of the present invention as defined by the appended claims.

What is claimed is:

1. A baler having a baler frame, a main drive assembly including a starter roll drive shaft mounted to rotate in a first direction on the baler frame, and a pick-up assembly connected to the baler frame, the pick-up assembly having a reverse control apparatus for a conveying rotor and further comprising:
   (a) a pick-up frame assembly connected to the baler frame;
   (b) a pick-up rotatably connected to the pick-up frame assembly;
   (c) a conveying rotor rotatably connected to the pick-up frame assembly; and
   (d) a pick-up drive assembly disposed on the pick-up frame assembly and connected to drive both the pick-up and the rotor, wherein the pick-up drive assembly comprises:
      (i) a rotatable first drive wheel disposed on the starter roll drive shaft;
      (ii) a clutch assembly operably connected to the first drive wheel, the clutch assembly having a first selective position to rotatingly engage the first drive wheel with the starter roll drive shaft and a second selective position to disengage the first drive wheel from the starter roll drive shaft;
      (iii) the reverse control apparatus comprising a hydraulic cylinder having a stroke with a first retracted position and a second extended position, the hydraulic cylinder connected at a first end to the pick-up frame assembly and connected at a second end to the clutch assembly, wherein when the hydraulic cylinder is in the second extended position the clutch assembly is in the second selective position, and when the hydraulic cylinder is in the first retracted position the clutch assembly is in the first selective position; and
      (iv) a second drive wheel rotatably connected to the pick-up frame assembly, the second drive wheel being connected to the first drive wheel by a flexible drive member so as to rotate in the first direction when the first drive wheel rotates in the first direction, and the second drive wheel is connected to rotate the rotor in a second direction, wherein the second drive wheel is connected to the second end of the hydraulic cylinder so as to rotate in a third direction that is the reverse of the first direction when the hydraulic cylinder is in the second extended position so that the second drive wheel rotates the rotor in a fourth direction that is the reverse of the second direction.

2. A baler as recited in claim 1, wherein the hydraulic cylinder is operably connected to move from the first retracted position to the second extended position in response to a signal from a remote switch.

3. A baler as recited in claim 1, wherein the reverse control apparatus further comprises a ratchet wheel attached to the second drive wheel so as to rotate therewith and the second end of the hydraulic cylinder is connected to a movable arm member that carries a ratchet wheel engaging dog member, wherein the ratchet wheel engaging dog member engages teeth of the ratchet wheel so as to effect rotation of the second drive wheel only in the third direction.

4. A baler as recited in claim 3, wherein the dog member has an edged portion and the teeth of the ratchet wheel are sloped so that the edge portion securely engages one of the teeth when hydraulic cylinder moves from the first retracted position to the second extended position.

5. A baler as recited in claim 4, wherein the reverse control apparatus further comprises a cam plate connected by a bar to the dog member, the cam plate being pivotally mounted on the arm member by a pivot shaft so that the cam plate and the dog member pivot on the pivot shaft as a single unit.

6. A baler as recited in claim 5, wherein the reverse control apparatus further comprises a biasing spring connected at one end to the arm member and at another end to the cam plate so as to bias the cam plate to rotate the dog member to engage the teeth of the ratchet wheel.

7. A baler as recited in claim 6, wherein the reverse control apparatus further comprises a roller disposed on a support arm so that when the hydraulic cylinder moves into the first retracted position the roller engages the cam plate and the cam plate rotates on the pivot shaft, so as to move the dog member out of engagement with the teeth of the ratchet wheel.

8. A baler as recited in claim 3, wherein the clutch assembly includes a second link member connected at one end to a second cam member of the clutch assembly and at another end to the arm member.

9. A baler as recited in claim 8, wherein the clutch assembly includes a first link member connected at one end to the baler frame and at another end to a first cam member of the clutch assembly.

10. A baler as recited in claim 9, wherein the first cam member provides a bearing for a rotatable first jaw member that is disposed on the starter roll drive shaft, wherein the first jaw member is attached to rotate with the first drive wheel, and the second cam member provides a bearing for a rotatable second jaw member, wherein the second jaw member is disposed on the starter roll drive shaft and has teeth to matingly engage teeth of the first jaw member.

11. A baler as recited in claim 10, wherein the second link member is connected to move the second cam member when the hydraulic cylinder moves between the first retracted position and the second extended position, respectively, wherein the second cam member is connected to move the second jaw member between a first engaging position corresponding to the first selective position and a second non-engaging position corresponding to the second selective position, wherein the second jaw member matingly engages and rotates the first jaw member when in the first engaging position and the second jaw member is disengaged from the first jaw member when in the second non-engaging position.

12. A baler as recited in claim 1, wherein the second drive wheel is disposed on a rotatable gear support shaft mounted on the pick-up frame assembly, wherein the second drive wheel, is disposed to rotate the gear support shaft, wherein a third gear is provided to rotate with the gear support shaft, wherein the rotor is disposed to rotate on a rotatable rotor drive shaft mounted to the pick-up frame assembly, wherein a fourth gear is provided to rotate on the rotor drive shaft, and wherein the third gear engages the fourth gear so as to rotate the fourth gear, the rotor drive shaft and the rotor when the second drive wheel rotates the third gear.

* * * * *